Oct. 16, 1956 J. H. KNOWLES 2,767,020
DISTRIBUTOR FOR TRICKLING FILTERS
Filed Dec. 21 1953 4 Sheets-Sheet 1

INVENTOR
JOHN H. KNOWLES,
BY William J. Fox
ATTORNEY

Oct. 16, 1956 J. H. KNOWLES 2,767,020
DISTRIBUTOR FOR TRICKLING FILTERS
Filed Dec. 21 1953 4 Sheets-Sheet 2

INVENTOR
JOHN H. KNOWLES,
BY William J Fox
ATTORNEY

Oct. 16, 1956   J. H. KNOWLES   2,767,020
DISTRIBUTOR FOR TRICKLING FILTERS
Filed Dec. 21 1953   4 Sheets-Sheet 3

INVENTOR
JOHN H. KNOWLES,
BY William J Fox
ATTORNEY

Oct. 16, 1956  J. H. KNOWLES  2,767,020
DISTRIBUTOR FOR TRICKLING FILTERS
Filed Dec. 21 1953  4 Sheets-Sheet 4
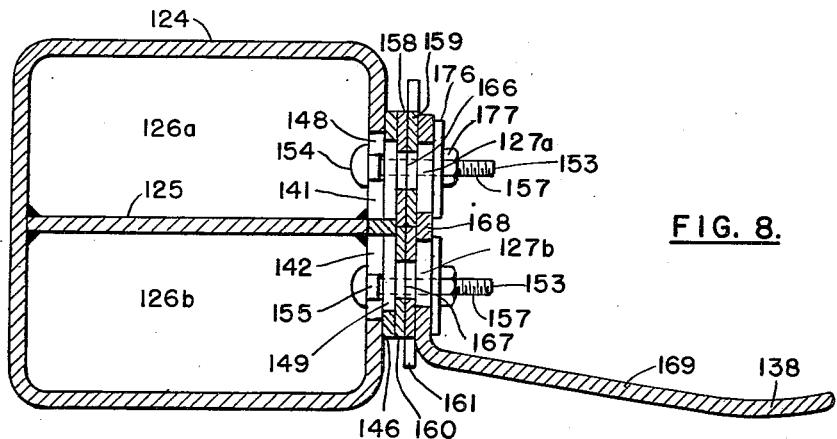
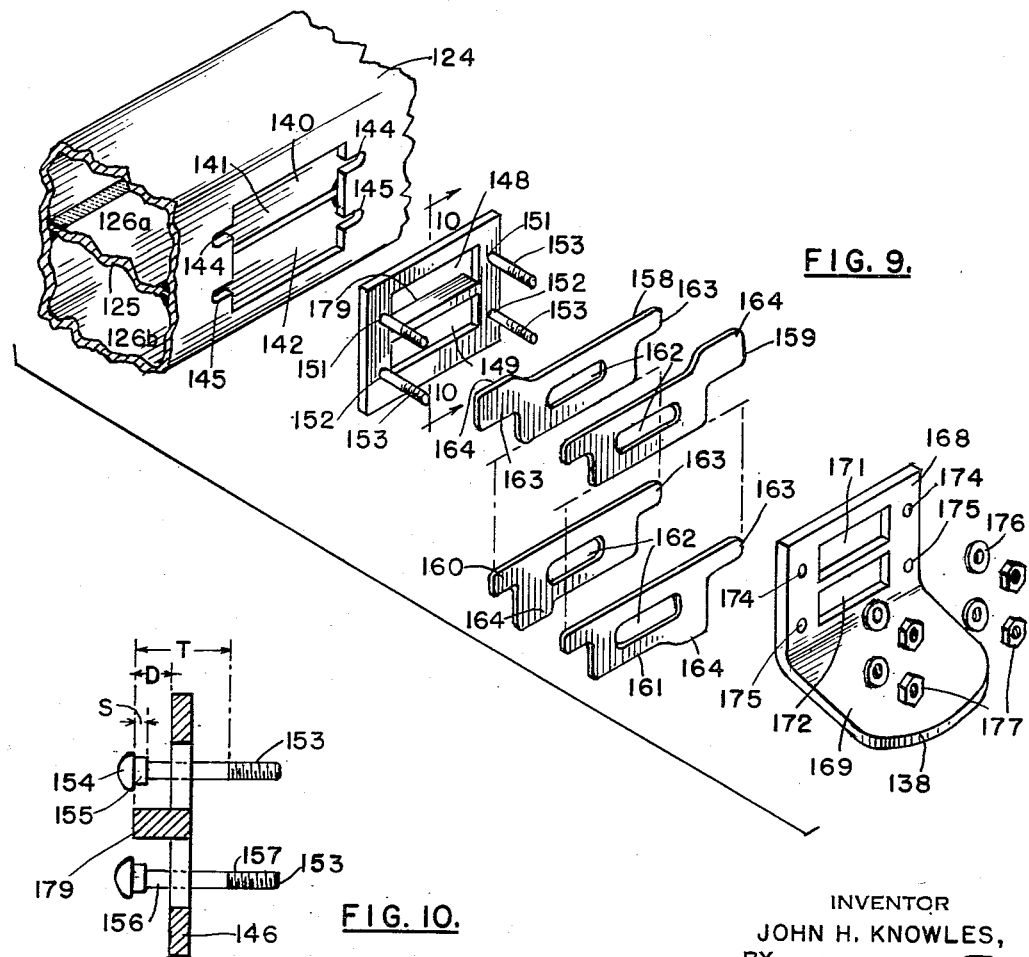
INVENTOR
JOHN H. KNOWLES,
BY William J Fox
ATTORNEY

United States Patent Office 2,767,020
Patented Oct. 16, 1956

2,767,020

DISTRIBUTOR FOR TRICKLING FILTERS

John Herbert Knowles, Cos Cob, Conn., assignor to Dorr-Oliver Incorporated, a corporation of Delaware Application December 21, 1953, Serial No. 399,280

14 Claims. (Cl. 299—69)

This invention relates to liquid distributors of the reaction-driven type which function to apply organically polluted liquids, such as sewage, to a filter bed of discrete material, usually in the form of crushed rock, for the purpose of aeration and biological oxidation.

A reaction driven distributor for applying liquid to a filter bed comprises a rotatable structure with a vertical axis of rotation, which structure has a central hollow portion with a plurality of horizontally, radially extending hollow distributing arms, each of which has along its trailing side a horizontal row of liquid emitting orifices usually in the form of horizontally elongated openings so shaped and disposed with respect to one another as to discharge therefrom respective streams of liquid for delivery in a desired uniform distribution upon the top surface area of the filter bed. Each such elongated opening is usually associated with a distributor attachment or spreader adapted to shape the stream emerging from the opening into a horizontal, fan-shaped spray or sheet of liquid for distribution onto the top of the filter bed as well as for providing the reactive forces for rotating the structure as long as liquid is applied thereto at an adequate rate and at an adequate pressure head. When applied by such distributors the liquid spread over the discrete material gravitates through the bed countercurrently to a stream of air rising through the interstices of the material in the bed. In this way, the liquid in transit through the filter bed is presented with large everchanging surfaces for liquid-air contact and for liquid-biological organism contact in order that the liquid may become aerated and biologically oxidized.

Heretofore one method of construction of the hollow distributor arm with its plurality of liquid emitting orifices and their respective spreader assemblies has involved the following steps. First, horizontally elongated openings of fixed size are formed at spaced intervals along the length of the arm, which arm is fabricated from sheet metal such as iron or the like. Adjacent the ends of each opening two holes are drilled and threaded by tapping. Following this operation, every exposed part of the arm is galvanized whereby, unfortunately, the tapped holes become plugged with spelter. Consequently, it has heretofore been necessary to unplug each and every hole by retapping which results in high fabrication costs and possible damage to the galvanized coating. The spreader assembly, comprising a gasket and a spreader which in turn comprises an upright flange portion with a discharge aperture therethrough and a generally horizontal lip portion, is then mounted and secured to the arm by means of cap screws inserted through aligned holes through the gasket and the flange portion of the spreader, and screwed into the tapped holes in the distributor arm. The respective apertures in the various structural parts of the spreader assembly are thus made to cooperate with the lateral opening in the arm to form a lateral discharge orifice.

It is a general object of this invention to improve upon the above described construction of distributor arms.

More particularly, it is one object of this invention to adapt the arms so that it becomes unnecessary to retap holes after galvanization of the arms.

It is another object of this invention to substantially eliminate tapped holes adjacent the openings.

It is still another object of this invention to shorten and to simplify the fabrication procedure, particularly in relation to mounting and securing the spreaders and gaskets to the respective openings in the distributor arm.

In summary, these and other objects which may appear as this specification proceeds, are attained by this invention which essentially comprises a series of lateral discharge openings formed in the distributor arm with each opening having a passageway area and two generally oppositely located, similarly shaped constricted areas that are each adapted to receive in interchangeable relationship the shank portion of a carriage bolt adjacent its head and to be larger than that size at which spelter commences to "bridge." A flexible gasket preferably with some property of resiliency is required for each opening in the arm, said gasket being characterized by an aperture therethrough of substantially the same size and shape as the corresponding passageway area of the opening in the distributor arm, and by two holes through the gasket adjacent the aperture, each of said holes being adapted, when the gasket is in position to tightly receive a carriage bolt inserted through and engaging the corresponding constricted area of the lateral discharge opening in the distributor arm to which the gasket relates. The invention also essentially comprises a spreader, but it may be of the conventional type heretofore used. In addition it is required that there be provided at least one, and preferably two interchangeable carriage bolts, made from conventional metallic materials, and comprising a head of size larger than the constricted area but smaller than the discharge opening passageway area, preferably a shank portion, at least adjacent the head, adapted to be in interchangeable relationship with the constricted area and to cooperate with said constricted area to non-rotatably station the bolt within that area, a threaded shank portion extending from the end opposite the head preferably at least to a distance from the head of the bolt sufficient to non-leakingly accommodate within that remaining non-threaded distance the width of the distributor arm wall adjacent the constricted area, the width of the various elements of the spreader assembly, and the width of a washer, when a nut is threaded onto the bolt to substantially the limit of the threaded portion.

In the fabrication procedure, according to this invention, the lateral discharge openings are formed in the distributor arm, each with a passageway area and the two oppositely located similarly shaped constricted areas, and the arm, if necessary, is galvanized. Following this step the arm is in condition for attachment of the spreader assemblies, the procedure for this being as follows.

In the preferred embodiment, a carriage bolt is inserted through each of the bolt holes in the gasket until the distance from the underside of the bolt head to the gasket corresponds substantially to the width of the distributor arm wall about the opening to which the spreader assembly is to be attached. The heads of the bolts are then moved towards each other, to thereby deform the gasket, until the distance between the bolt heads is less than the width of the passageway area. While maintaining this distance, the heads of the bolts are inserted through the passageway area and the shank of each bolt is engaged with the nearest constricted area whereby the adjacent surface of the deformed, flexible gasket is made to contact the outside surface of the arm about the opening. The contacting of the heads of the bolts with the inside surface of the distributor arm wall about the opening, the engagement of the shank portions of the bolts with the constricted areas, and the engagement of the bolts with the gasket, together establish and maintain the bolts in place for the subsequent mounting and securing of the remaining elements of the spreader assembly.

The spreader is then mounted with the bolts passing through corresponding bolt holes therein and the assembly is made secure to the arm by threading nuts onto the bolts, preferably separating each nut from the spreader by a cooperative washer. The openings and apertures are thus adapted to cooperately form a lateral discharge orifice.

In a number of instances it may be desired to be able to adjust the flow of liquid from each individual orifice not only to gain an optimum amount of reactive forces necessary to turn the distributor arm but to obtain optimum distribution of liquid over the surface of the filter bed. While a single orifice plate may be utilized for this purpose, the preferred embodiment calls for at least two adjustable orifice plates made of brass or other materials having some rigidity may be disposed between the flexible gasket and the spreader, said plates being characterized by an aperture through each of them having preferably the same general shape but not necessarily the same size as the passageway area of the opening in the arm to which they relate. These adjustable orifice plates, placed next to the gasket on the bolts and separating the gasket from the spreader, are adapted with means for obtaining sidewise movement of the plates to adjust the relative position of the apertures to each other and thus the size of the passageway cooperatively formed by the apertures. Upon mounting the structural elements the nuts are tightened just sufficiently to hold the structure in place. The plates are adjusted to obtain the desired size of the passageway, and then the nuts are tightened down to firmly secure the spreader assembly to the distributor arm.

This invention is not only applicable to distributor arms characterized by a single hollow compartment extending the length of the arm, but it is also applicable to the type of distributor arm which is characterized by a plurality of separate hollow compartments within the arm extending the length of the arm. Another advantage of this invention is that it is applicable to non-galvanized distributor arms.

Before turning to the drawings, it should be noted that since this invention may be embodied in several forms without departing from the spirit or essential characteristics thereof, the present embodiments are therefore illustrative and not restrictive since the scope of the invention is defined by the appended claims rather than by the description preceding them and all changes that fall within the metes and bounds of the claims, or of forms that are their functional as well as conjointly cooperative equivalents are therefore intended to be embraced by those claims.

In the drawings, it will be observed that:

Figure 8 is an enlarged, detailed side view of another type of distributor arm, showing a spreader assembly mounted according to the teachings of this invention;

Figure 9 is an exploded perspective view of Figure 8 illustrating various component parts comprising the spreader assembly in relation to the distributor arm; and Figure 10 is a side view of the flexible gasket shown in Figure 9.

Figure 1:
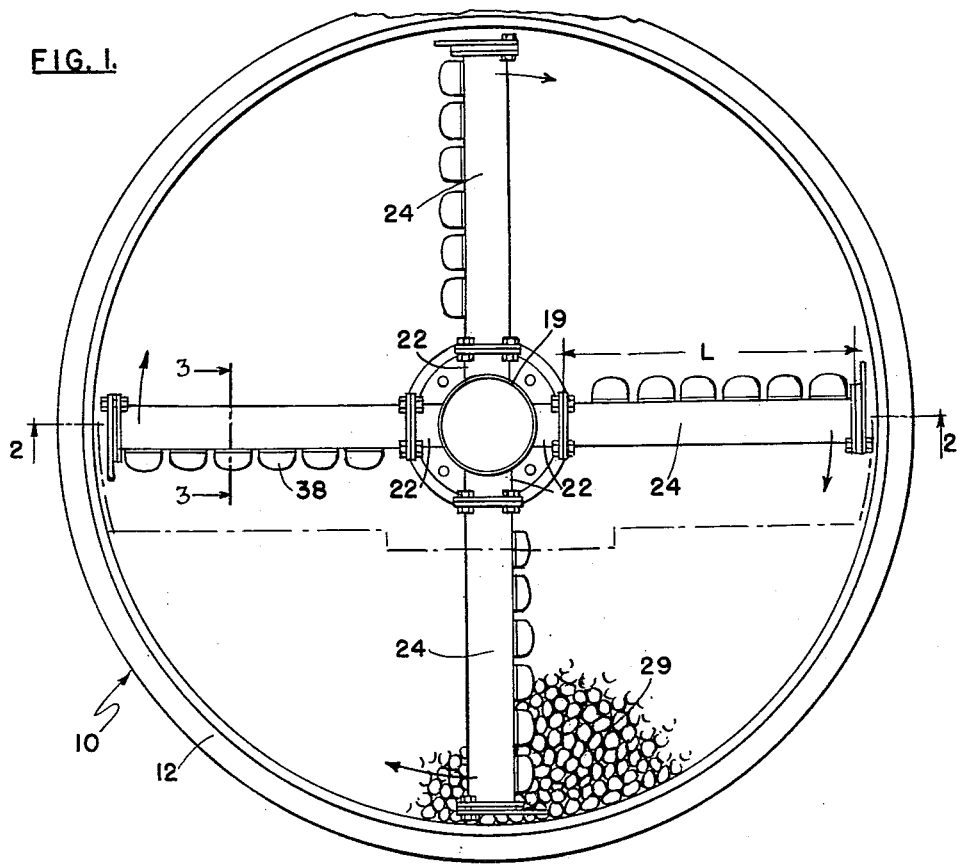
Figure 1 is a plan view of a trickling filter showing one type of a reactive force, rotatable distributor structure comprising this invention.
Figure 2:
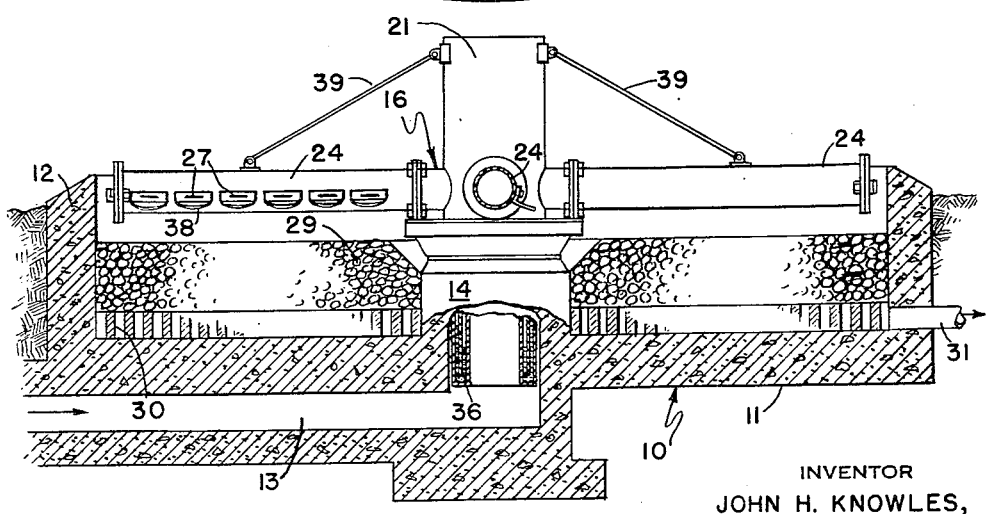
Figure 2 is a sectional side view taken along the line 2—2 of Figure 1.

Before referring more specifically to the drawings, in Figures 1 and 2 a trickling filter is shown with a rotatable liquid distributor of a conventional type but embodying this invention. The filter construction as a whole comprises the conventional basic elements, namely, a round and relatively shallow concrete tank structure 10 having a bottom 11, a vertical wall 12, and a feed inlet conduit 13 underneath the bottom for feeding sewage liquid through the center of the bottom upwardly into the liquid distributor proper. That is to say, a central hollow pier structure 14 rises from the bottom, providing a base containing a ball-bearing supporting structure, not shown, on which the rotatable distributing structure 16 proper rests. Structure 14 also contains a liquid sealing arrangement 36 which, combined with the ball bearing structure enables the rotatable distributor to rotate with a minimum of friction and with a maximum of vertical stability. The distributor structure 16 comprises a hollow hub portion 19 of a generally cylindrical configuration. The hub portion 19 further comprises a vertical cylindrical portion 21 rising from the rotatable supporting structure. The hub portion 19 has near its lower end a set of four hollow neck portions 22 extending radially therefrom and disposed at right angles with respect to one another. Each neck portion 22 has a rigid flange connection 23 with a hollow distributor arm 24 of a length L on which there is an outer end flange provided with a removable end closure member. Guy rods 39 attached to cylindrical hub portion 21 and to each arm 24 function to support each arm in a generally horizontal position. It will be observed that each distributor arm is provided with a number of lateral discharge orifices 27 associated with spreaders 38 arranged on the trailing side of each arm so that a reactive driving force resulting from the discharge of liquid from the orifices onto the spreaders acts upon the trailing side of each arm to impart to the structure 16 a rotational movement in the direction shown by the arrows at the end of each arm.

Between the central hollow pier structure and the tank wall 12 is located filter bed 29 which comprises discrete material such as crushed rock or the like. Filter bed 29 is separated from the tank bottom 11 by drainage structure or grating structure 30 wherein effluent draining from the bed collects. Conduit 31 disposed through the bottom of wall 12 and communicating with the spaces within the drainage structure 30 provides a means of withdrawing collected effluent.

In operation, polluted liquid to be delivered to the filter bed 29 continuously passes through feed inlet conduit 13, up through hollow pier structure 14, out through hollow hub portion 19 to hollow distributor arms 24 to pour out through orifices 27 onto spreaders 38 which function to spread the emitted liquid stream into a fan-shaped sheet or spray for distribution onto the surface of filter bed 29 as well as for providing reactive driving forces for rotating the structure. The liquid upon distribution gravitates through the bed of discrete particles to contact biological organisms growing on the surfaces of the filter bed particles as well as to encounter air rising up through said bed. Aerated and biologically oxidized liquid ultimately drains from the bed into the spaces of grating structure 30 to collect therein and to be withdrawn therefrom through conduit 31.

Figure 3:
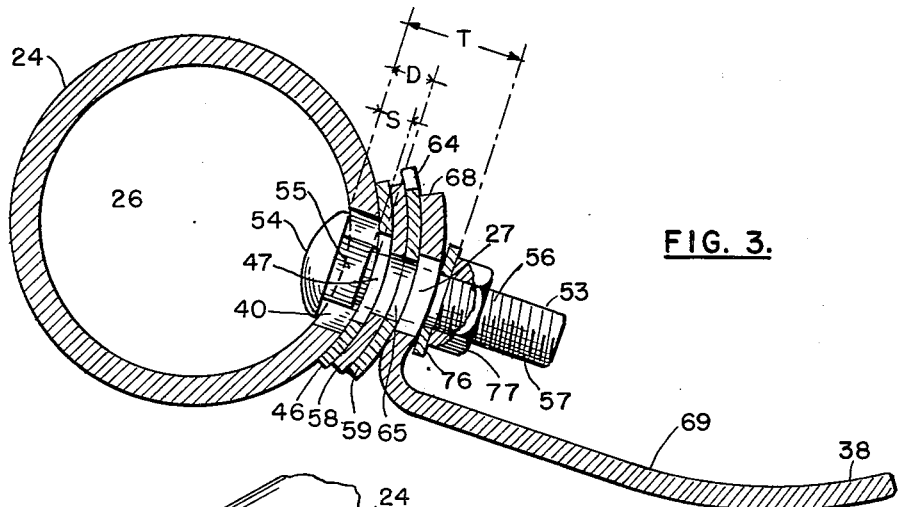
Figure 3 is an enlarged, detailed side view of the distributor arm and spreader assembly of this invention taken along the line 3—3 of Figure 1.
Figure 4:
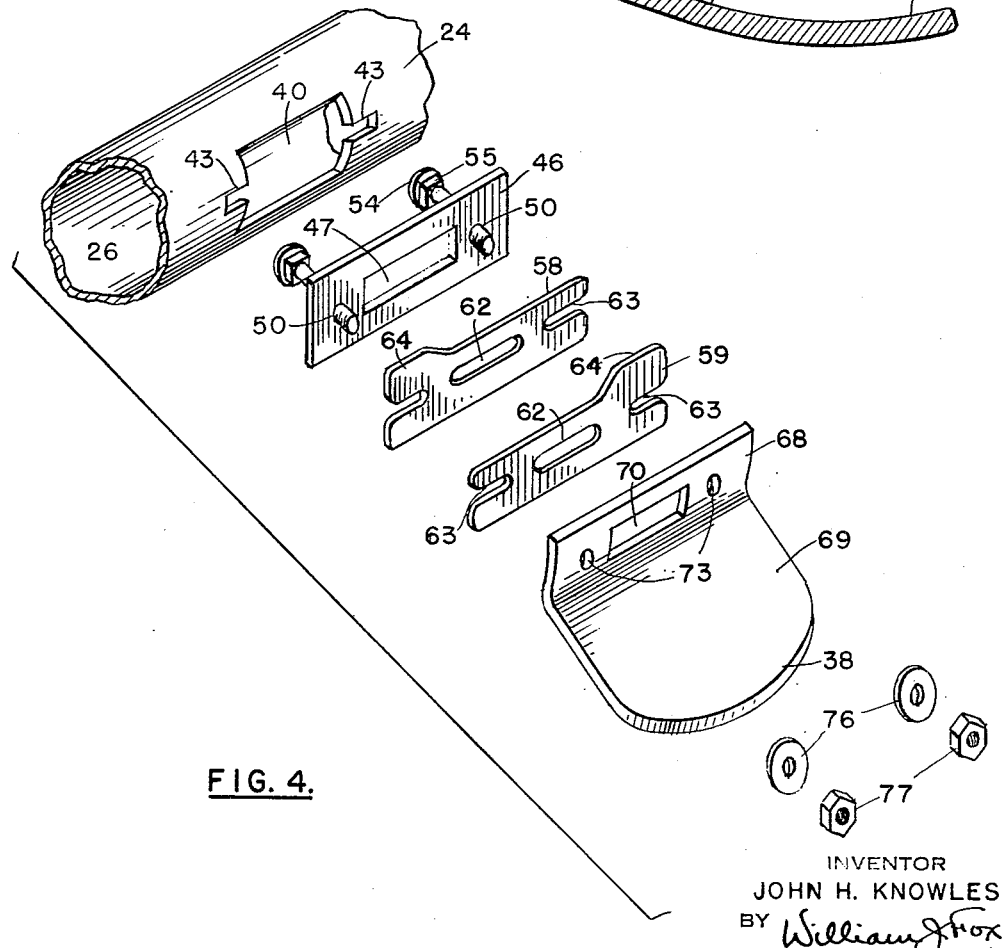
Figure 4 is an exploded perspective view of Figure 3 showing various component parts comprising the spreader assembly in relation to the distributor arm.

While the rotatable distributor 16 as described comprises for the most part conventional structural elements, each lateral discharge orifice 27 is characterized by several unique features, which are shown in Figures 3 and 4. In these figures it will be observed that lateral discharge orifice 27 comprises a rectangularly shaped passageway area in lateral discharge opening 40 formed in the side of distributor arm 24, and aperture 47 through flexible gasket 46 disposed adjacent to the arm 24, adjustable passageway 65 formed through apertures 62 in adjustable orifice plates 58 and 59, and aperture 70 disposed through spreader 38.

Lateral discharge opening 40, besides comprising a passageway area of a generally rectangular shape also comprises two constricted areas, each of which is shown in the form of a horizontally disposed, rectangular shaped end-wise extending slot 43 of width greater than the width at which spelter commences to "bridge" in galvanization of the distributor arm. The two constricted areas, it will be observed, are the mirror image of each other.

Gasket 46 of a generally rectangular shape is constructed from a flexible or limber material such as rubber or the like preferably having some element of resiliency. A bolt hole 50 is disposed therethrough adjacent each end of its aperture 47, each hole being adapted to be substantially in alignment with corresponding slot 43 when the gasket is in place, and to tightly engage the shank of an interchangeable carriage bolt 53.

Each of the adjustable orifice plates 58 and 59, while being generally rectangular in shape is provided with at least an end-wise projecting hanger portion 63 at each end, and with an integral lip portion 64 projecting from the top portion of one end of the plate whereby each plate may be manually moved sidewise when it is in place.

Spreader 38, constructed from a metallic material such as brass or the like, comprises a vertically disposed flange portion 68 and a generally horizontally disposed lip portion 69. Aperture 70 is disposed through the flange portion with a bolt hole 73 adjacent each end of the aperture adapted to be in alignment with the corresponding slot 43 in the arm 24 when the spreader is in position.

Carriage bolts 53, constructed from conventional material such as brass or the like, are utilized to secure the foregoing elements to distributor arm 24. Each bolt comprises a head 54 of larger size than the slot 43, a square shank portion adjacent the head, having a length S adapted to engage the slot 43 and cooperate therewith to non-rotatably station the bolt in the slot, and a cylindrical shank portion 56, at least part of said shank portion 56 comprising a threaded section 57 with the threads extending from the end of the bolt opposite the head 54 to at least a distance T from the underside of the head 54. In this embodiment it is preferred that the length S of the shank portion be maximally limited to the width D of the wall of the distributor arm 24 adjacent the slots. The length T is at the maximum equal to the combined width of the structural elements. Washers 176 and nuts 177 constructed from conventional material such as brass or the like and adapted to cooperate with the carriage bolts 53 complete the essential structural elements for the spreader assembly.

Figure 5:
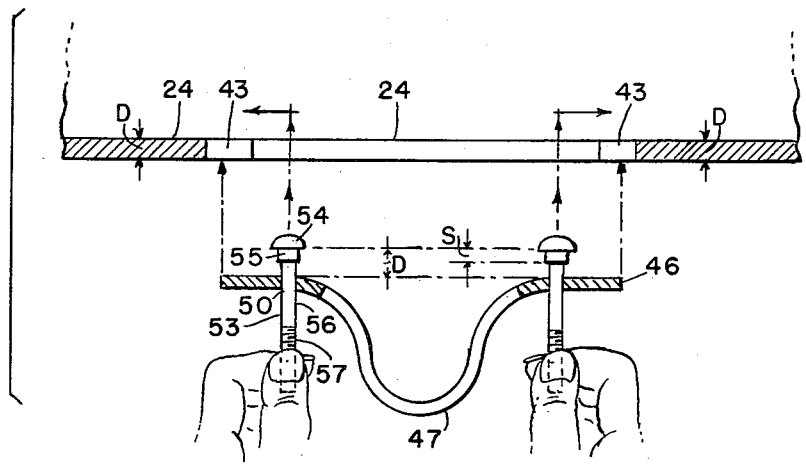
Figure 5 is a functionalized top view showing the wall of the distributor arm at the region about a lateral discharge opening, and also showing a deformed flexible gasket with carriage bolts in place ready for insertion of the bolt heads into the opening.
Figure 6:
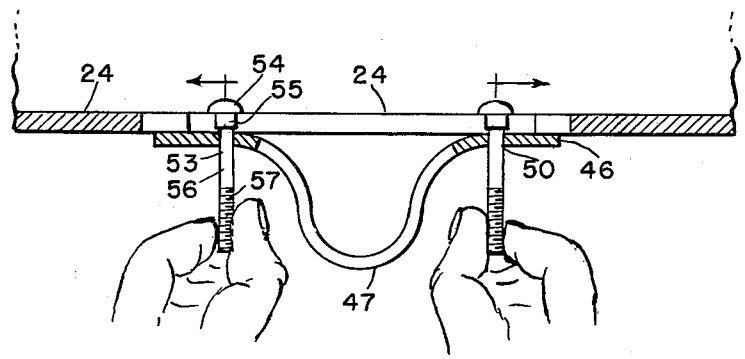
Figure 6 is a functionalized view illustrating the position of the gasket with the heads of the bolts placed through the passageway area of the lateral discharge opening into the interior of the distributor arm prior to returning the deformed, flexible gasket to normal position.
Figure 7:
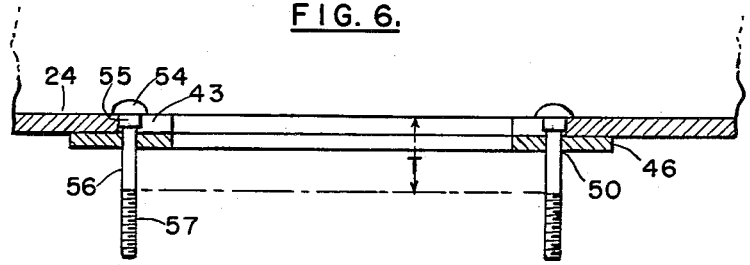
Figure 7 shows the gasket and bolts in place in the respective constricted areas of the lateral discharge opening in the distributor arm.

In the fabrication procedure lateral openings 40 are formed in the distributor arm 24 and the arm is galvanized. There being no need to retap the slots 43, the arm is in readiness for attachment of the spreader assemblies, the procedure of which is as follows. First, carriage bolt 53 is inserted through each one of the bolt holes 50 in the flexible gasket 46 until there is a distance D between the underside of carriage bolt head 54 and the surface of the gasket, said distance D being substantially equal to the thickness of the wall of the distributor arm 24 adjacent the sidewise extending slots 43. As illustrated in Figure 5, the bolts are then moved towards each other whereby the gasket is flexed, until the distance between the heads of the bolts is less than the width of the passageway area of the opening 40. As illustrated in Figure 6, while maintaining this distance, the heads of the bolts are then inserted through the passageway area of aperture 40 into the interior 26 of the arm and, as shown in Figure 7, the bolts are moved away from each other to engage the the square shank portion 55 of each bolt with the nearest slot 43 of the opening 40 whereby the flexible gasket is brought into cooperative relationship with the wall of the distributor arm 24 surrounding the opening 40. The contacting of the heads of the bolts with the inside surface of the distributor arm wall surrounding the opening 40, the engagement of the shank portion 55 with the slots 43, and the engagement of the shank portion 56 with the gasket 46 together establish and maintain the position of the bolts for subsequent mounting of the remaining elements in the spreader assembly.

Secondly, the adjustable orifice plates are disposed on the bolts 53 with the hangers 63 resting on the bolts with the lip portion 64 on plate 58 being on one side of the opening 40 and the lip portion 64 on plate 59 being on the other side of lateral opening 40.

Finally, spreader 38 is mounted on the bolts with the bolts passing through the bolt holes 73. Brass washers 76 are slipped over the cylindrical shank portion 56 protruding beyond the flange portion 68, and brass nuts 77 are threaded on the bolts until the aforedescribed structural elements cooperate loosely to form lateral discharge orifice 27. At this point the adjustable orifice plates 58 and 59 are adjusted by means of the lips 64 to provide passageway 65 of the desired size. Following this operation the nuts 77 are further tightened on the bolts to tightly press the structural elements to distributor arm 24 whereby the spreader assembly is attached to the arm.

In Figures 8 and 9 another type of distributor arm is shown, which comprises a hollow arm 124 divided horizontally by a partition plate 125 into top and bottom compartments 126a and 126b extending the length of the arm. Spaced along the side of distributor arm 124 will be found lateral discharge orifices from the top and bottom compartments, the top discharge orifice being 127a and the bottom discharge orifice being 127b. In this embodiment liquid which emerges from each discharge orifice is spread into a fan-shaped spray or sheet by a common spreader 138.

Top lateral discharge orifice 127a comprises a passageway area in aperture 141 formed in the side of hollow distributor arm 124, and aperture 148 disposed through flexible gasket 146, and adjustable passageway 166 formed by apertures 162 disposed through adjustable orifice plates 158 and 159, and an aperture 171 disposed through the flange portion 168 of spreader 138.

Bottom lateral discharge orifice 127b comprises an aperture 142 formed in the side of hollow distributor arm 124, an aperture 149 disposed through flexible gasket 146, an adjustable passageway 167 formed by apertures 162 disposed through adjustable orifice plates 160 and 161, and an aperture 172 disposed through the flange portion 168 of spreader 138.

Top aperture 141 in the distributor arm 124, besides being characterized by a passageway area, also comprises two, oppositely located, constricted areas each of which is shown to be an end-wise extending, horizontally disposed, slot 144. Similarly the bottom aperture 142, besides having a passageway area, is characterized by two, oppositely located, constricted areas each of which is likewise shown to be an end-wise extending, horizontally disposed, slot 145. Each of the slots 144, 145, is required to be wider than the width at which spelter commences to "bridge" during the galvanization process. It will also be observed that the constricted areas on one side of opening 140 which is divided into the top aperture and bottom aperture by the partition plate 125 are the mirror images of the constricted areas on the other side of opening 140, and that the constricted areas on the one side of opening 140 are substantially the same size and shape.

Flexible gasket 146, constructed from a material such as rubber or the like preferably having some element of resiliency, is characterized by bolt hole 151 disposed therethrough adjacent each end of the aperture 148, each hole adapted to be in line with a corresponding slot 144 of top aperture 141 in the distributor arm when the gasket is in position adjacent the arm and preferably adapted to tightly engage a carriage bolt 153 upon insertion therethrough. A bolt hole 152 is likewise disposed through the gasket adjacent each end of the aperture 149 to be in similar alignment with a corresponding slot 145 of the bottom aperture 142 in the distributor arm when the gasket is in position and likewise preferably adapted to tightly engage a carriage bolt 153 upon insertion therethrough. Upper aperture 148 and bottom aperture 149 in the flexible gasket are separated from one another by a partition portion 179 which juts beyond one face of gasket 146 a distance D substantially equal to the width of the wall of the hollow distributor arm 124 in the region of the partition plate 125. The extended ridge portion 179 functions to fill in the space between the face of gasket 146 and the partition plate 125 when the gasket is in position.

Each of the adjustable orifice plates 158 and 159, 160 and 161, besides having an aperture 162 disposed therethrough, is characterized by an end-wise projecting hanger portion 163 disposed at the top of each end of the plate, which functions to support the plates upon carriage bolts and to enable the orifice plates to be movable sidewise upon said bolts. Top adjustable orifice plates 158 and 159 are provided with an upwardly projecting lip 164 integral with hanger portion 163 at one end of each of said plates. Bottom adjustable orifice plates 160 and 161, however, are provided with a downwardly projecting lip portion 164 integral with the bottom and adjacent one end of each of said plates. The lip portions 164 are provided to enable the plates to be manually moved sidewise when they are in position to thereby regulate the size of adjustable passageway 166 and adjustable passageway 167, with the passageways respectively aligned generally with the apertures 141 and 142.

Spreader 38, constructed of a metallic material such as brass or the like, comprises a generally vertical flange portion 168 through which the apertures 171 and 172 are disposed, and a generally horizontal portion 169. Adjacent each end of top aperture 171 is disposed a bolt hole 174 while adjacent each end of bottom aperture 172 is disposed a bolt hole 175, the bolt holes being adapted to each receive a carriage bolt 153 and to be in line with the slots 144 and 145 when the apertures 171 and 172 are in line with the apertures 141 and 142.

In this embodiment four carriage bolts are used to position the foregoing described structural elements in relation to the apertures formed in hollow distributor arm 124. Each carriage bolt 153, constructed of a metallic material such as brass or the like, comprises a head 154, a square shank portion 155 having a length S from the underside of head 154, a cylindrical shank portion 156 having a threaded portion 157 commencing at the end opposite the head 154 and terminating at a length T from the underside of head 154. Length S is maximally limited to the width of the distributor arm wall adjacent the slots 144 and 145. Length T should at most be substantially equal to the width of the foregoing described structural elements. Also used are washers 176 and nuts 177 constructed of material similar to that from which the bolts are constructed and adapted to cooperatively engage the bolts.

In the fabrication procedure of the two compartment embodiment, the upper and lower halves of the distributor arm are formed separately. A plurality of notches corresponding to aperture 140 with slots 144 and aperture 142 with slots 145 are then formed in the trailing sides of the upper and the lower halves respectively, said notches being so positioned that, upon assembly, the vertical, transverse axis of each notch in one half will correspond to the vertical, transverse axis of a notch in the other half. Partition plate 125 is then sandwiched between the so notched upper and lower halves in a position adaptable to welding into a single operative unit, and the assembly is so welded, thereby forming a top compartment 126a and a bottom compartment 126b. Following galvanization, the arm is in condition for attachment of the spreader assemblies, the procedure for which is as follows for each opening.

Carriage bolts 153 are inserted through bolt holes 151 and 152 of flexible gasket 146, the heads of the bolts of 154 being on the same side of said gasket as the ridge portion 179 until a distance D separates the underside of the head 154 and the nearest face of the deformable gasket 146, distance D being equal to the width of the wall of the hollow distributor arm 124 adjacent the slots 144, 145. The bolts are manually moved towards each other in more or less parallel alignment, thereby deforming the gasket until distances between the heads are less than the horizontal lengths of the passageway areas of apertures 141 and 142. The heads of the bolts with the gasket flexed are then inserted through the orifices 141 and 142 so that the heads are within the compartments 126a and 126b. The bolts are then manually moved sidewise away from each other while still maintaining their general parallel alignment and the square shank portion 155 of each bolt is made to engage the respective slots 144 and 145 whereby the gasket is brought into contact with the outside surface of the distributor arm wall surrounding the opening 140. Under these conditions the contacting of the heads of the bolts with the inside surface of the distributor arm wall about the opening 140, the engagement of the square shank portion 155 with the slots 144 and 145, and the tight engagement of shank portion 156 with the gasket all function to establish and maintain the bolts in place for subsequent mounting of the remaining elements of the spreader assembly.

Top adjustable orifice plates 158 and 159 are then positioned adjacent the upper aperture 148 of the gasket with the hanger portion 163 resting on top bolts 153 and with the lip portion of orifice plate 158 being on one side and the lip portion 159 being on the opposite side. The bottom adjustable orifice plates 160 and 161 are similarly positioned adjacent gasket 146 by resting hanger portions 163 on the bottom bolts 153 with lip portion 164 of adjustable orifice plate 160 on one side and the lip portion 164 of adjustable orfice plate 161 on the other side.

Spreader 138 is then placed adjacent the orifice plate with each of the carriage bolts 153 passing through the respective top bolt holes 144 and bottom bolt holes 145 of the flange portion. Washers 176 are then placed in position on each of the protruding ends of the carriage bolts, and nuts 177 are threaded on said ends of each of the carriage bolts until the aforedescribed structural elements cooperate loosely to form lateral discharge orifices 127a and 127b. At this point the adjustable orifice plates 158 and 159, 160 and 161 are adjusted in relation to each other by means of the lip portions 164 to adjust passageways 166 and 167 to the desired sizes. Following this operation the nuts 177 are then tightened down on carriage bolts 153, preferably to the limit of the threaded portion of each bolt whereby the said structural elements are pressed tightly to distributor arm 124 and lateral discharge orifices 127a and 127b.

As an example of the utility of this invention and of the advantages to be gained therefrom, the teachings of this invention were applied in the construction and fabrication of four rotary distributors, each having four arms, all of the distributors being constructed for installation in one sewage treatment plant. It was estimated that had the old and conventional procedure been followed, 4,640 bolt holes would have had to be retapped which, under present conditions, would have taken approximately 200 man hours. By following the teachings of this invention approximately 200 man hours are saved. Other savings are made possible by the simplified procedure which this invention makes possible, not only from the point of view of labor expense, but also from the point of view of material and maintenance expense.

Another feature of advantage of this invention is that upon mounting the gasket and bolts as described, the head portions of the bolts in contact with the distributor arm wall, the contacting of the shank portion of the bolts passing through the constricted areas, and the gasket all function to station the bolts for mounting the adjustable orifice plates, if they are used, the spreader, the washers and nuts. This feature eliminates the need for holding the bolts in place and holding the combination of gasket and spreader to the arm while securing these elements to the distributor arm wall.

I claim:

1. A liquid distributor of the rotary type adapted for spraying liquids into filter beds and the like which comprises, in combination, a distributor arm having a series of lateral discharge orifices, each of said orifices comprising an opening in the distributor arm wall consisting of a discharge passageway area and at least one constricted area contiguous thereto; a retaining gasket adjacent each opening having an aperture therethrough substantially corresponding to said dischare passageway area, and having at least one cut-out area adapted to receive a fastening means adjacent the aperture and in line with said constricted area; a spreader member comprising a substantially horizontal spreader portion and a substantially vertical flange portion for attachment to the said distributor arm, said flange portion having an aperture substantially corresponding to both said discharge passageway area in the distributor arm and said aperture in the gasket, said flange having further at least one hole adjacent the aperture and adapted to receive a fastening means and registering with the said cut-out area through the retaining gasket; a fastening means anchored by way of said constricted area, extending outwardly through the said cut-out area in the gasket and the said hole in the spreader, together with securing means adapted to act cooperatively with said fastening means and thereby tighten together the various elements of the assembly; and means for cooperatively engaging a portion of the spreader remote from said fastening means and holding the said remote portion of the spreader member tightly against the said gasket in order that the compressive force exerted by the spreader to the gasket be substantially uniformly distributed over the entire surface of the gasket, whereby the passageway area of the distributor arm opening, the apertured gasket, and the apertured spreader cooperatively form a non-leaking, readily demountable lateral discharge orifice.

2. A liquid distributor according to claim 1 wherein the means for cooperatively engaging a portion of the spreader remote from the said fastening means and holding the said portion of the spreader tightly against the said gasket comprises a second fastening means, interchangeable with the first mentioned fastening means, said second fastening means passing through a second constricted area in the distributor arm opening corresponding to, but oppositely disposed from, the constricted area which is adapted to act cooperatively with the first fastening means, through a corresponding cut-out area in the retaining gasket, and through a corresponding hole in the spreader; and means adapted to act cooperatively with said fastening means and thereby tighten together the various elements of the assembly, whereby the passageway area of the distributor arm opening, the apertured gasket, and the apertured spreader cooperatively form a non-leaking, readily demountable lateral discharge orifice.

3. A liquid distributor according to claim 2 wherein the said retaining gasket is constructed of resilient material adapted to frictionally position at least a pair of the said fastening means, which pass through the cut-out areas contained in the retaining gasket in non-slipping relationship to the gasket, said retaining gasket being further adapted, upon being subjected to parallel, compressive lateral forces applied to opposite edges of the gasket, to temporarily deform in a manner whereby the distance between the edges to which the said forces are applied is lessened, but to spring back into its original shape when the said forces are removed, whereby the said fastening means are firmly held in spaced relationship, and wherefor the assembly of the elements comprising the lateral discharge orifices is facilitated.

4. In a liquid distributor according to claim 2 wherein the said fastening means are carriage bolts, each of said bolts comprising a head portion of a size smaller than the said passageway area but larger than the said constricted area and located within the interior of the said distributor arm in contacting relationship with the interior of the distributor arm wall adjacent the said constricted area; an unthreaded shank portion extending from the said head portion for a lineal distance substantially equal to, but not greater than, the combined thicknesses of the distributor arm wall and the other structural elements of the discharge orifice assembly; a threaded shank portion extending from the unthreaded shank portion to the end of the bolt opposite the head portion, and of sufficient length to act in cooperative relationship to a tightening means; and a tightening means comprising a nut threaded internally in a manner adapted to engage the threaded shank portion and thereby bring the various elements of the lateral discharge orifice assembly into tight, non-leaking readily demountable relationship.

5. A liquid distributor according to claim 2 wherein the said fastening means are adapted, through contact with those portions of the distributor arm wall which form the said constricted areas through which the fastening means pass, to non-rotatably station the said fastening means, whereby the assembly of the various elements of the lateral discharge orifice is facilitated.

6. A liquid distributor of the rotary type adapted for spraying liquids into filter beds and the like which comprises, in combination, a distributor arm having a series of lateral discharge orifices, each of said orifices comprising an opening in the distributor arm wall consisting of a discharge passageway area, and two oppositely disposed constricted areas contiguous thereto; comprising a substantially horizontal spreader portion, and a substantially vertical flange portion for attachment to the said distributor arm, said flange having further two bolt holes, one on either side of, and adjacent to, the said aperture and registering with the constricted areas in the distributor arm; two bolt fastening means anchored in the said constricted areas, and extending outwardly therefrom, together with tightening means adapted to act cooperatively with said fastening means and thereby draw the various elements of the assembly firmly together; and a retaining gasket for disposition between the distributor arm and the flange portion of the spreader member and having an aperture therethrough substantially corresponding to said discharge passageway area, and having further two bolt holes adjacent the aperture, said retaining gasket acting cooperatively with said passageway and constricted areas in the distributor arm, said spreader member, said fastening means, and said tightening means to form a non-leaking, readily demountable, lateral discharge orifice.

7. In a liquid distributor according to claim 6 wherein the said retaining gasket is constructed of a resilient material adapted to position fastener bolts passing through the bolt holes contained therein in non-slipping relationship to the gasket, and further adapted upon being subjected to parallel compressive lateral forces applied to opposite edges of the gasket, to temporarily deform in a manner whereby the distances between the edges to which the said forces are applied is lessened, but to spring back into its original shape when the said forces are removed, whereby the said fastener bolts are firmly held in spaced relationship, and wherefor the assembly of the elements comprising the lateral discharge orifice is facilitated.

8. A liquid distributor according to claim 6 wherein the said fastening means are carriage bolts comprising a head portion of a size smaller than the said passageway area, but larger than the said constricted areas and located within the interior of the said distributor arm in contacting relationship with the interior of the distributor arm wall adjacent the said constricted areas, an unthreaded shank portion extending from the head portion for a lineal distance substantially equal to, but not greater than the combined thicknesses of the distributor arm wall and the other structural elements of the discharge orifice assembly; a threaded shank portion extending from the unthreaded shank portion, to the end of the bolt opposite the head portion, and of sufficient length to act in cooperative relationship to a tightening means; and a tightening means comprising a nut threaded internally in a manner adapted to engage the said threaded shank portion and thereby bring the various elements of the lateral discharge orifice assembly into tight, non-leaking, readily demountable relationship.

9. The liquid distributor according to claim 6, wherein the said bolt fastening means are adapted, through contact with those portions of the distributor arm wall which forms the said constricted areas, to non-rotatably station the said bolt fastening means, whereby an assembly of the various elements in the lateral discharge orifice is facilitated.

10. A liquid distributor of the rotary type adapted for spraying liquids into filter beds and the like which comprises, in combination, a hollow distributor arm subdivided by a partition plate into an upper compartment and a lower compartment, each compartment extending the length of the said arm and having a series of dual lateral discharge orifices serving to discharge liquid from both the lower and upper compartments, each of the said orifices comprising an opening in the distributor arm wall consisting of a discharge passageway area functionally divided into an upper half and a lower half by the said partition plate and at least one constricted area contiguous to the said discharge passageway area; a flexible retaining gasket adjacent each opening having apertures therethrough substantially corresponding to said upper and lower discharge passageway areas, and having at least one cut-out area adapted to be in line with the said constricted area in the distributor arm; a spreader member comprising a substantially horizontal spreader portion and a substantially vertical flange portion for attachment to the said distributor arm, said flange portion having apertures substantially corresponding to said discharge passageway area and said apertures in the gasket, said flange further having at least one bolt hole registering with the cut-out area through the retaining gasket; a bolt fastening means anchored in the said constricted area extending outwardly through the bolt hole of the gasket and the bolt hole of the spreader, together with means to act cooperatively with said fastening means and thereby tighten together the various elements of the assembly; and means for cooperatively engaging a portion of the spreader from said fastening means and holding the said remote portion of the spreader member tightly against said gasket in order that the compressive force exerted by the spreader to the gasket be substantially uniformly distributed over the entire surface of the gasket, whereby the passageway areas of the distributing arm opening, the apertured gasket, and the apertured spreader cooperatively form a non-leaking, readily demountable lateral discharge orifice.

11. A liquid distributor according to claim 10 wherein the means for cooperatively engaging a portion of the spreader remote from the said fastening means and holding the said portion of the spreader tightly against the said gasket comprises a second bolt fastening means interchangeable with the first mentioned bolt fastening means, said second bolt fastening means passing through a second constricted area in the distributor arm opening corresponding to, but oppositely disposed from the constricted area which is adapted to act cooperatively with the first bolt fastening means, through a corresponding cut-out area in the retaining gasket, and through a corresponding bolt hole in the spreader; and means adapted to act cooperatively with the said bolt fastening means and thereby tighten together the various elements of the assembly, whereby the passageway area of the distributor arm opening, the apertured gasket, and the apertured spreader cooperatively form a non-leaking, readily demountable lateral discharge orifice.

12. A liquid distributor according to claim 11 wherein the said retaining gasket is constructed of resilient material adapted to frictionally position at least a pair of the said fastening means, which pass through the bolt holes contained in the retaining gasket in non-slipping relationship to the gasket, said retaining gasket being further adapted upon being subjected to parallel, compressive lateral force applied to opposite edges of the gasket to temporarily deform in a manner whereby the distance between the edges to which the said forces are applied is lessened, but to spring back into its original shape when the said forces are removed, whereby the said fastening means are firmly held in spaced relationship and wherefore the assembly of the elements comprising the lateral discharge orifices is facilitated.

13. A liquid distributor according to claim 11 wherein the said fastening means are carriage bolts comprising a head portion of a size smaller than either of the said upper or lower passageway areas, but larger than the constricted area, and located within the interior of the distributor arm in contacting relationship with the interior of the distributor arm wall adjacent the constricted area; an unthreaded shank portion extending from the said head portion for a lineal distance substantially equal to, but not greater than, combined thicknesses of the distributor arm wall and the other structural elements of the discharge orifice assembly; a threaded shank portion extending from the unthreaded shank portion to the end of the bolt opposite the head portion and of sufficient length to act in cooperative relationship to the tightening means; and a tightening means comprising a nut threaded internally in the manner adapted to engage the threaded shank portion and thereby bringing the various elements of the lateral discharge orifice assembly into tight, non-leaking, readily demountable relationship.

14. A liquid distributor according to claim 10, wherein the said fastening means are adapted, through contact with those portions of the distributor arm wall which form the said constricted areas to non-rotatably station the said fastening means, whereby the assembly of the various elements of the lateral discharge orifice is facilitated.

References Cited in the file of this patent
UNITED STATES PATENTS

| | | |
|---|---|---|
| 2,225,836 | Lund | Dec. 24, 1940 |
| 2,347,330 | Noyes | Apr. 25, 1944 |